(12) United States Patent
Saad et al.

(10) Patent No.: US 11,243,851 B2
(45) Date of Patent: Feb. 8, 2022

(54) INTELLIGENT STORAGE AND RECOVERY OF BACKUP DATA USING MULTIPLE STORAGE TIERS OF A CLOUD-BASED STORAGE

(71) Applicant: EMC IP Holding Company LLC, Hopkinton, MA (US)

(72) Inventors: Yossef Saad, Ganei Tivka (IL); Alex Solan, Hertzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/743,916

(22) Filed: Jan. 15, 2020

(65) Prior Publication Data

US 2021/0216413 A1    Jul. 15, 2021

(51) Int. Cl.
*G06F 11/14* (2006.01)
*H04L 29/08* (2006.01)

(52) U.S. Cl.
CPC ...... *G06F 11/1469* (2013.01); *G06F 11/1451* (2013.01); *G06F 11/1464* (2013.01); *H04L 67/1097* (2013.01); *G06F 2201/82* (2013.01)

(58) Field of Classification Search
CPC .. G06F 11/14; G06F 11/1451; G06F 11/1448; G06F 11/1469; G06F 11/1464
See application file for complete search history.

(56) References Cited

U.S. PATENT DOCUMENTS

| | | | | |
|---|---|---|---|---|
| 8,229,897 | B2* | 7/2012 | Cannon | G06F 11/1451 707/679 |
| 8,849,764 | B1* | 9/2014 | Long | G06F 16/907 707/646 |
| 8,959,182 | B1* | 2/2015 | Anderson | G06F 21/6245 709/219 |
| 2007/0185934 | A1* | 8/2007 | Cannon | G06F 11/1469 |
| 2009/0016190 | A1* | 1/2009 | Jakob | G06F 3/065 369/109.01 |
| 2010/0115332 | A1* | 5/2010 | Zheng | G06F 11/1466 714/6.2 |
| 2011/0208933 | A1* | 8/2011 | Selfin | G06F 11/1441 711/162 |
| 2013/0024618 | A1* | 1/2013 | Doron | G06F 3/0643 711/114 |
| 2014/0074787 | A1* | 3/2014 | Berman | G06F 11/1451 707/639 |

(Continued)

*Primary Examiner* — Kamini B Patel
(74) *Attorney, Agent, or Firm* — Dergosits & Noah LLP; Todd A. Noah (57) ABSTRACT

Described is a system for intelligently storing and recovering backup data using multiple storage tiers of a cloud-based storage. The intelligent storing of backup data may leverage different cost structures associated with various cloud-based storage tiers by efficiently distributing data to more cost effective tiers. The system may also provide a coordinated (e.g. phased) recovery that prioritizes the recovery of certain files so that a user can gain access to such files in a shorter amount of time. The system may also provide enhanced storage and recovery functionality (e.g. via specialized user interface elements) by leveraging placeholder files to offload and recover individual files, and expedite the recovery of individual files during a substantial recovery process.

20 Claims, 4 Drawing Sheets

(56) References Cited

U.S. PATENT DOCUMENTS

| | | | |
|---|---|---|---|
| 2014/0372384 A1* | 12/2014 | Long | G06F 16/21 |
| | | | 707/679 |
| 2015/0113324 A1* | 4/2015 | Factor | G06F 3/0647 |
| | | | 714/20 |
| 2016/0170844 A1* | 6/2016 | Long | G06F 16/21 |
| | | | 707/679 |
| 2016/0224430 A1* | 8/2016 | Long | G06F 11/1451 |
| 2017/0235590 A1* | 8/2017 | Sinha | G06F 21/56 |
| | | | 718/1 |
| 2018/0270290 A1* | 9/2018 | Sinha | G06F 9/541 |
| 2018/0357246 A1* | 12/2018 | Strogov | G06N 5/025 |

* cited by examiner

| Filename | Type | Size |
|---|---|---|
| Report.doc | Word Document | 126kb |
| Vacation_Video.mpg | Video | 106,467kb |
| Resume.pdf | PDF Document | 500kb |
| Family_Photo.jpg | Photo | 5,675kb |
| Image_Viewer_Setup.exe | Application | 45,467kb |

FIG. 3 (300)

| Filename | Type | Size |
|---|---|---|
| Report.doc | Word Document | 126kb |
| Vacation_Video.mpg — 312 | | 106,467kb |
| Resume.pdf — 314 | | 500kb |
| Family_Photo.jpg | | 5,675kb |
| Image_Viewer_Setup.exe | | 45,467kb |

Context menu:
- Open
- ...
- Offload To Cloud
- ...
- Delete
- Rename

FIG. 4 (400)

| Filename | Type | Size |
|---|---|---|
| Report.doc | Word Document | 126kb |
| Vacation_Video.t2b — 412 | Cloud Archive | 20kb |
| Resume.pdf | PDF Document | 500kb |
| Family_Photo.jpg | Photo | 5,675kb |
| Image_Viewer_Setup.exe | Application | 45,467kb |

FIG. 5 (500)

| Filename | Type | Size |
|---|---|---|
| Report.doc | Word Document | 126kb |
| Vacation_Video.t2b — 412 | | 20kb |
| Resume.pdf — 514 | | 500kb |
| Family_Photo.jpg | | 5,675kb |
| Image_Viewer_Setup.exe | | 45,467kb |

Context menu:
- Open
- ...
- Recover From Cloud
- ...
- Delete
- Rename

INTELLIGENT STORAGE AND RECOVERY OF BACKUP DATA USING MULTIPLE STORAGE TIERS OF A CLOUD-BASED STORAGE

TECHNICAL FIELD

This disclosure relates to data backup systems, and more particularly, a storage and recovery of backup data using multiple cloud-based storage tiers.

BACKGROUND

Users of personal computing devices such as desktop or laptop devices often use cloud-based backup services delivered as a "Software-as-a-Service" (SaaS). More particularly, these backup services are typically referred to as "Backup-as-a-Service" (BaaS). These backup services may periodically (or continuously) copy data to a cloud-based storage by performing an initial copy of all files, and then subsequently only sending changed files. However, these backup services often store backup files on the same cloud-based storage, which may be provided by a third-party storage provider. Accordingly, the storage solution may not be optimized for storage costs that may be incurred by the BaaS provider or the user. For example, when files are stored on the same storage tier, the same costs may be are incurred to store each backup file irrespective of the access requirements associated with the individual backup files. Moreover, these backup services often implement an uncoordinated recovery process from the cloud-based storage. For example, an uncoordinated recovery process often creates a certain amount of downtime during which a user cannot access files that have been backed-up. Accordingly, there is a continued need to provide efficient storage and recovery tools when using cloud-based backup services.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for intelligently storing and recovering backup data using multiple storage tiers of a cloud-based storage system (or service). The intelligent storing of backup data may leverage different cost structures associated with various storage tiers (or classes) provided by the cloud-based storage service. For example, the system may analyze and classify files to be backed-up such that backups of certain files (e.g. important or more frequently accessed documents) may be stored on a standard (or high performance) storage tier, and other files (e.g. larger, less often accessed multimedia files) may be stored on an archival or low-cost storage performance tier. In addition, the system may implement an intelligent recovery of such files. For example, the intelligent recovery may include a coordinated recovery process that prioritizes certain files so that a user can gain access to such files in a shorter amount of time, rather than having to wait until the full recovery process is completed. For example, the system may recover files in phases (e.g. based on a storage tier) while still allowing the expedited recovery of certain individual files.

To provide such capabilities, the system may include a backup agent that manages such storing and recovery processes. The backup agent may also provide additional tools for specialized (or enhanced) storage and recovery operations. For example, the backup agent may allow a user to offload storage of certain files stored on the computing device to the cloud-based storage system. For instance, the backup agent may provide a user interface element that allows a user to initiate such an operation. Moreover, in response to offloading a file, the file may be replaced on the computing device with a placeholder file. The user may then perform certain operations in association with the placeholder file. For example, the backup agent may provide a user interface element that allows a user to initiate an individual (or expedited) recovery of the offloaded file represented by the placeholder file.

The backup agent may also create a placeholder file as part of a recovery process. For example, when recovering a large number of files (e.g. recovering the entire computing device), which may take hours, the system may first recover a portion of a file system (e.g. filenames, directory structures, etc.) and create a placeholder file indicating a file is yet to be recovered. In addition, the backup agent may allow a user to initiate expedited recovery of such a file. For example, the backup agent may provide a user interface element that allows a user to initiate expedited recovery of the file represented by the placeholder file. In response to requesting expedited recovery, the backup agent may immediately commence recovering the file (e.g. move the file to the top of the recovery queue).

Accordingly, in some embodiments, the system may introduce intelligence into storage and recovery processes when using multiple storage tiers of a cloud-based storage.

Figure 1:
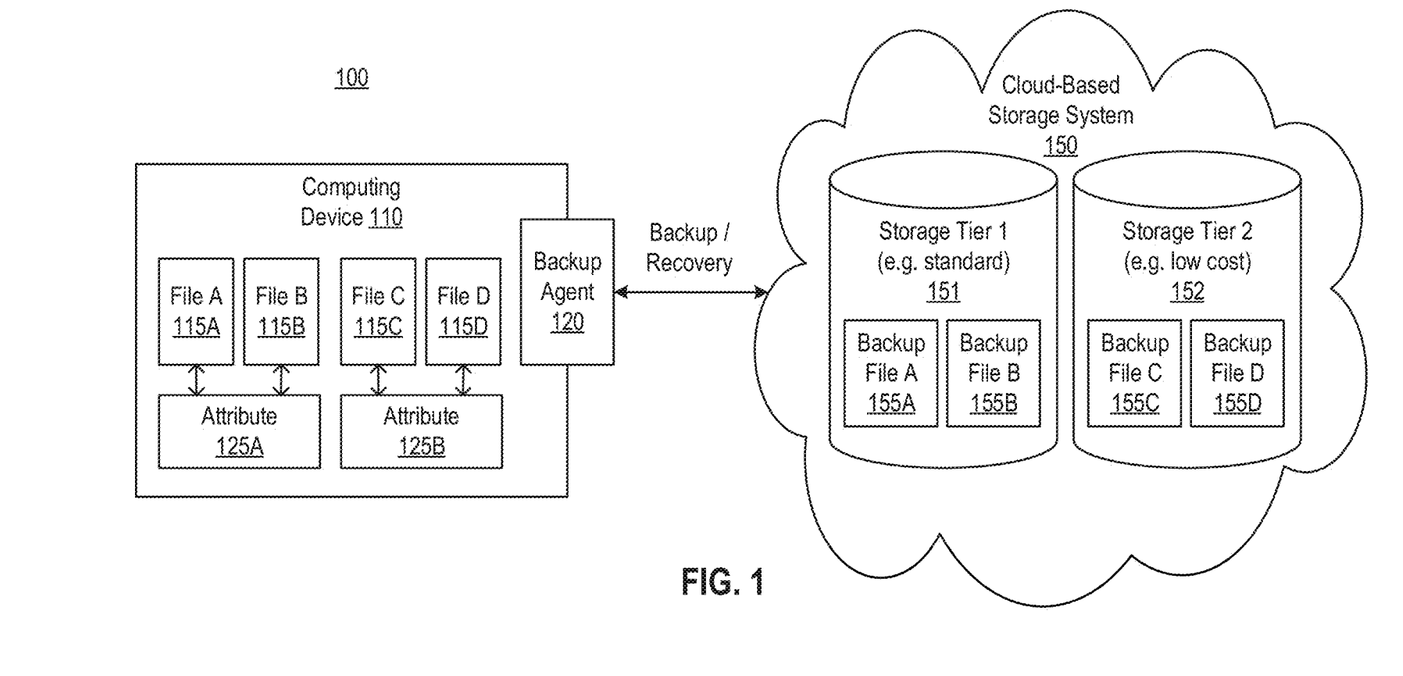
FIG. 1 is a block diagram illustrating an example operating environment for storage and recovery of backup data using multiple tiers of a cloud-based storage system according to one or more embodiments of the disclosure.

FIG. 1 is a block diagram illustrating an example operating environment 100 for storage and recovery of backup data using multiple tiers of a cloud-based storage system according to one or more embodiments of the disclosure.

As shown, the environment 100 may include a computing device 110, backup agent 120, and a cloud-based (or on-demand) storage system 150. The cloud-based storage system 150 may provide on-demand storage services (e.g. storage-as-a-service). In some embodiments, the provider of backup services (and the associated backup agent 120) may be provided by a different entity than the entity that provides the cloud-based storage services (and the associated cloud-based storage system 150). In some embodiments, the storage system 150 may provide scalable object storage capability, although any storage architecture (or technology, technique, etc.) is contemplated. It should be noted that the components of operating environment 100 may interact via a network, which may be any type of wired or wireless network including a local area network (LAN), a wide area network (WAN), or a direct communication link, or other suitable connection.

As shown, the computing device 110 (e.g. server, desktop, laptop, tablet, smartphone, wearable device, etc.) may store files 115 (e.g. documents, multimedia files, binaries, etc.) that a user wishes to be backed-up, and thus, providing the ability to recover such files in the event of data loss, hardware failure, viruses, etc. For example, the computing device 110 (or user) may subscribe to a backup service (e.g. BaaS). As shown in this example, the computing device 110 may store a first set of files (e.g. File A 115A, and File B 115B), and a second set of files (e.g. File C 115C, and File D 115D) that are backed-up to a cloud-based storage system (or storage system) 150 via the backup agent 120. For example, some of the backup and recovery functionality provided by the backup service may be provided by the backup agent 120, which may be installed on, or remotely work in conjunction with (e.g. via a server), the computing device 110. For example, the backup agent (or component) 120 may be an application (or process, daemon, etc.) that executes in the background of the operating system (OS) of the computing device 110. For instance, the backup agent 120 may interact directly with components (e.g. tiers) of the storage system 150 (e.g. via an API) to perform various file operations such as reading, writing, moving files, etc. In some embodiments, as part of a backup process, the backup agent 120 may continuously monitor and synchronize files (e.g. files 115) stored on the computing device 110 with a backup copy (e.g. files 155) stored on the storage system 150. For example, the backup agent 120 may initially copy an entire file to the storage system 150, and then subsequently only copy the changes to such files as part of the synchronization process. As shown in this example, storage system 150 may store: Backup File A 155A, and Backup File B 155B, which are backups (or backup copies) of File A 115A, and File B 115B, respectively; and Backup File C 155C and Backup File D 155D, which are backup copies of File C 115C, and File D 115D, respectively.

As described, backup files (e.g. backup files 155) may be distributed amongst various storage tiers (or classes) provided by the storage system 150. For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. As shown in this example, storage system 150 may include Storage Tier 1 151, which may be a standard (or high performance) storage tier that is associated with a first storage cost (or cost per unit of storage), and Storage Tier 2 151, which may be an archival or low-cost storage tier that is associated with a second storage cost (or cost per unit of storage). For example, the storage cost (e.g. GB/month) associated with Storage Tier 2 152 may be lower than the storage cost associated with Storage Tier 1 151. Thus, efficiently storing data on a lower tier storage may provide substantial cost savings to a subscriber (e.g. a backup service provider, or user) of the cloud-based storage service.

By way of example, if Storage Tier 1 151 has a pricing scheme that includes 2.3 cents (or $0.023) per GB/month, and a customer account stores 200 GB of data all on the Tier 1 storage, the cost would amount to $4.6 per month. For a backup service provider that supports 10,000 customers, the extrapolated total would amount to $552,000 per year. However, if 50% of the 200 GB of data for a customer account were to be stored on lower tier storage, the backup service provider would incur significant costs savings. For example, if Storage Tier 2 152 has a pricing scheme that includes 0.4 cents (or $0.004) per GB/month, and a customer account stores 100 GB of data on the Tier 2 storage, and 100 GB of data on the Tier 1 storage, the cost would amount to $2.7 per month, which extrapolates to a total amount of $324,000 per year for 10,000 customers. Thus, such a scheme approximately translates to a 41% reduction in costs to the backup service provider. It should be noted that other storage fees such as access fees or bandwidth fees may also be reduced using a lower cost storage tier. In addition, the example includes only two storage tiers, but additional tiers and associated pricing schemes are also contemplated.

When storing backup files (e.g. backup files 155), the backup agent 120 may distribute the backup files to the various storage tiers of the storage system 150 by classifying the corresponding (or associated) files (e.g. files 115) into various categories. Accordingly, the distribution of backup files based on the categories may be defined by a backup policy (or guidelines, preferences, settings, etc.). In some embodiments, the classification of the files to be backed-up (e.g. files 115) may be based on one or more attributes 125 associated with the files. For example, the first set of files (e.g. File A 115A, and File B 115B) may be classified based on a first attribute 125A, and the second set of files (e.g. File C 115C, and File D 115D) may be classified based on a second attribute 125B. The attributes (or criteria, factors, characteristics, parameters, etc.) 125 may be determined (or derived, obtained, retrieved, identified, etc.) by the backup agent 120 from various sources such as the file itself, a file system, metadata associated with a file, information stored and managed by the backup agent 120, or any other source.

In some embodiments, these attributes 125 may include a file type or a file extension. For example, the file extension may be used to determine file types that may include documents (doc, txt, pdf, etc.), multimedia (e.g. mpg, mp3, etc.), photos (e.g. jpg, gif, etc.), or any other file type that may be stored by the storage system 150. For instance, backups of commonly accessed files such as documents may be stored on Storage Tier 1 151 for efficient recovery, while backups of larger, less often accessed multimedia files may be stored on Storage Tier 2 152.

In some embodiments, the attributes 125 may also include a storage location associated with the files. For example, files stored in certain drives or directories may be backed-up to a particular storage tier. For instance, files stored within a directory associated with documents (e.g. a "My Documents" (or similar) directory) may indicate that such files are important or commonly accessed, and accordingly, backups of such files may be stored on Storage Tier 1 151, whereas backups of files associated with a directory associated with long term or archival storage may be stored on Storage Tier 2 152.

In some embodiments, the attributes 125 may also include various metadata associated with a file such as author, file size, various dates or times such as a creation date, last modified date, last accessed date, etc., comments, tags, title, filename, etc. For example, backups of files that have been accessed, created, saved, etc. within a predetermined time period (e.g. most recently) may be stored on Storage Tier 1 151. As another example, backups of files that have not been accessed for a certain amount of time may be stored on Storage Tier 2 152. As yet another example, backups of files exceeding a certain file size may be stored on Storage Tier 2 152.

In some embodiments, a backup policy and/or recovery policy may be automatically determined by the backup agent 120. For example, the backup agent 120 may provide an interactive questionnaire to a user as part of an initialization (or installation) process. Accordingly, based on the answers provided by the questionnaire, the backup agent 120 may determine attributes 125 (e.g. file extensions) that are used to distribute backup files amongst the storage tiers of the storage system 150. The backup agent 120 may also provide an interface to allow a user to specify certain policies or preferences that may be used when distributing backup files. For example, the backup agent 120 may provide an interface that allows a user to select certain files in which the corresponding backup files are directed to certain storage tiers. In addition, in some embodiments, the backup agent 120 may also use a machine learning algorithm to distribute backup files amongst storage tiers. For example, a backup service provider may analyze data (e.g. files and associated attributes) from all its customers and determine that backups of files with certain attributes should be directed to certain storage tiers based on customer behavior or preferences. For example, backups of files that are associated with a high degree of expedited recover requests (as further described herein) may be directed to a higher tier storage. As another example, a backup service provider may analyze customer behavior after performing a recovery. For instance, backups of files that users access immediately following a recovery may be directed to a higher storage tier so that they are prioritized during recovery.

As part of a recovery process, the backup agent 120 may directly access the storage system 150 to retrieve the necessary data to recover the files (e.g. files 115) of the computing device. In some embodiments, the recovery process may be performed in multiple phases. For example, high priority files such as those with backups stored on Storage Tier 1 151, may be recovered before the files with backups stored on Storage Tier 2 152. As further described herein, the backup agent 120 may allow a user to request expedited recovery of certain files such as those with backups stored on Storage Tier 2 152. In addition, the backup agent 120 may also recover files based on a recovery (or priority) ordering (or scheme, policy, etc.). For example, certain files amongst those stored on a particular storage tier may be prioritized based on various parameters, criteria, or attributes (e.g. attributes 125). For example, the recovery ordering of files may be based on a file type or file extension.

The backup agent 120 may also provide various tools to provide additional backup and recovery functionality. For example, these tools may work in conjunction with an OS of the computing device 110 to provide specialized (or enhanced) user interface elements. As further described herein, the user interface elements (and associated operations) may provide a user with intuitive tools for a more efficient storage and recovery process. For example, the backup agent may provide a "plug-in" for specialized user interface elements that may be part of a file management application (e.g. file explorer, finder, etc.) provided by the OS of the computing device 110. In addition, the backup agent 120 may work in conjunction with the file system of the computing system to provide placeholder files. For example, the placeholder files may indicate a particular file has been offloaded to the storage system 150, or the placeholder file may indicate a particular file is yet to be recovered. In some embodiments, the backup agent 120 may provide the specialized user interface elements in association with such placeholder files to allow a user to initiate certain operations such as offloading a file to the storage system 150, and expediting recovery of a file. Examples of such placeholder files and specialized user interface elements are further described with reference to FIGS. 2-5.

Figure 2:
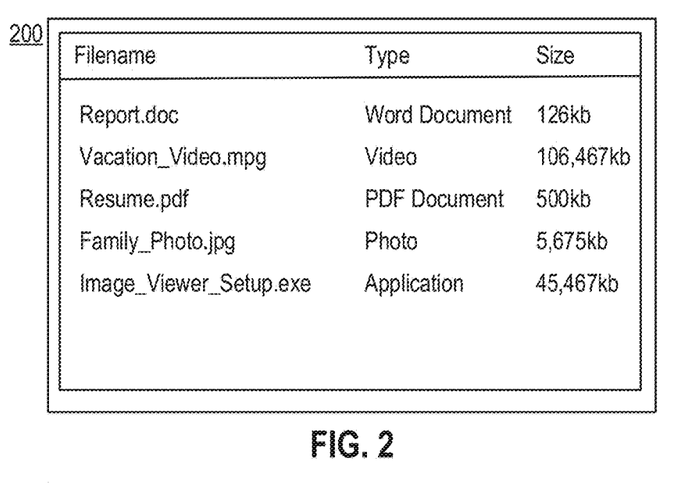
FIG. 2 is a diagram illustrating an example user interface displaying files stored by a computing device that are backed-up to the cloud-based storage system according to one or more embodiments of the disclosure.

FIG. 2 is a diagram 200 illustrating an example user interface displaying files stored by a computing device that may be backed-up to the storage system according to one or more embodiments of the disclosure. Shown in this example is a user interface that may be part of a file manager application (e.g. file explorer, finder, etc.) used to locate or manage files stored on the computing device (e.g. computing device 110). For example, the listing of files may represent a set of files (e.g. files 115) that may be backed-up to a cloud-based storage system (storage system 150). As shown, the files may be associated with different attributes (e.g. attributes 125), which in this case, may include different file types, file extensions, file sizes, etc. As described, a backup agent (e.g. backup agent 120) may provide the ability to perform additional backup and recovery operations. In some embodiments, these operations may be initiated from specialized user interface elements (or menus, plug-ins, components, etc.). For example, a user may offload the storage of particular files to the cloud-based storage system as further described with reference to FIG. 3.

Figure 3:
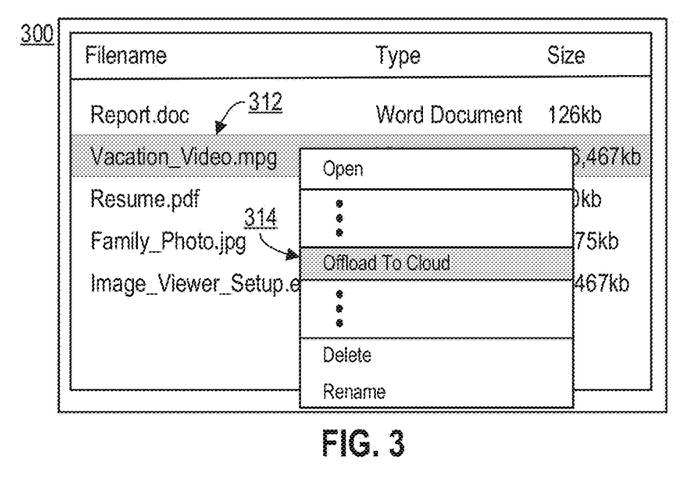
FIG. 3 is a diagram illustrating an example user interface including a user interface element allowing a user to initiate an offloading of a file to the cloud-based storage system according to one or more embodiments of the disclosure.

FIG. 3 is a diagram 300 illustrating an example user interface including a user interface element allowing a user to initiate offloading of a file to a cloud-based storage system according to one or more embodiments of the disclosure. In some embodiments, an offloading operation may include removing (e.g. or deleting) a file from the local storage (e.g. storage on the computing device itself), and instead, storing the file on the cloud-based storage system. In some embodiments, the file may be stored on a particular (or default) storage tier.

As shown in this example continued from diagram 200, a user may invoke a user interface menu (e.g. via a right click, dual-finger press, etc.) in association with a particular file 312, which in this example, includes a video file (e.g. file with the filename of "Vacation_Video.mpg"). In response to invoking the menu in association with the particular file 312, the user interface may display a menu that includes an offloading user interface element (or menu option) 314 (e.g. "Offload To Storage" option). Accordingly, the user may initiate offloading storage of the particular file 312 by selecting the offloading user interface element 314. In addition, although not shown in this example, the user interface element 314 may also allow the user to select the particular storage tier that stores the offloaded file. In some embodiments, in response to offloading a particular file, the file may be replaced by a placeholder file as further described with reference to FIG. 4.

Figure 4:
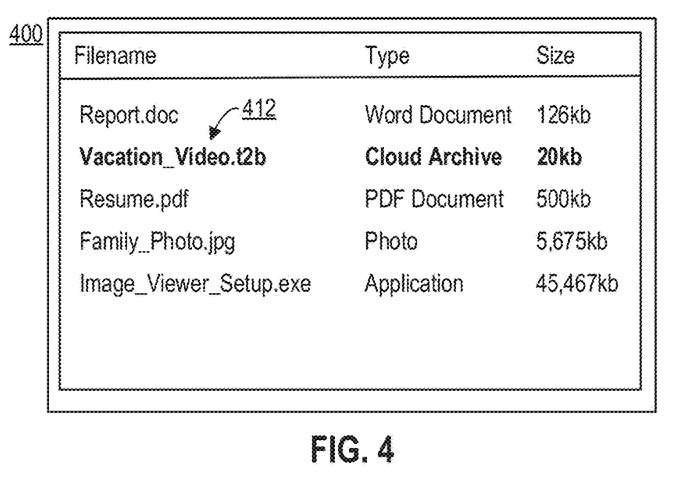
FIG. 4 is a diagram illustrating an example user interface displaying files stored by a computing device including a placeholder file according to one or more embodiments of the disclosure.

FIG. 4 is a diagram 400 illustrating an example user interface displaying files stored by a computing device including a placeholder file according to one or more embodiments of the disclosure. In some embodiments, the backup agent may write a small placeholder file to the file system of the computing device to represent a particular file. As shown in this example continued from diagram 300, a particular file (e.g. video file with the filename of "Vacation_Video.mpg") may be replaced with a placeholder file 412. As shown in this example, the placeholder file 412 may have the same filename as the original file, but include a different file extension that indicates the storage location of the corresponding (or associated) backup file. In addition, as shown, the file type displayed by the interface may be updated to indicate the file type associated with an offloaded file (e.g. "Cloud Archive"). In this example, the file extension (e.g. "t2b") indicates the backup file (or offloaded file) is stored on a particular storage tier (e.g. Storage Tier 2 152), whereas a different file extension (e.g. "t1b") may indicate storage on a different storage tier (e.g. Storage Tier 1 151). In addition, as shown, the file size of the placeholder file 412 may only be a fraction of the original file size since the placeholder file 412 may include only limited data such as cloud-based storage location, unique identifying information (e.g. hash value), etc.

As further described herein, a placeholder file 412 may be created in response to certain operations (or use cases). For example, in a first use case, as described in diagram 300, a placeholder file 412 may be created in response to offloading the corresponding file to the cloud-based storage system. In a second use case, the placeholder file 412 may be created as part of a recovery process to indicate a file is yet to be recovered (or in the process of being recovered). Accordingly, once the recovery of the file is complete (e.g. all the required data is transferred or fetched from the cloud-based storage system), the placeholder file 412 may be replaced by the actual (or original) file, including the original file extension.

In some embodiments, a recovery operation may be initiated in association with a particular placeholder file 412 as further described with reference to FIG. 5.

Figure 5:
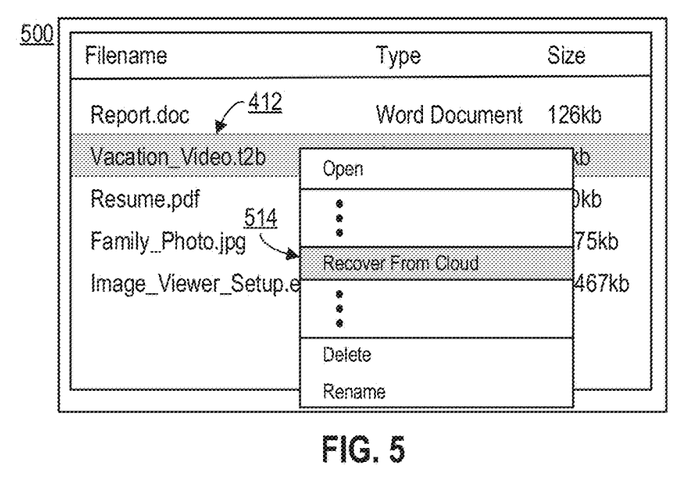
FIG. 5 is a diagram illustrating an example user interface including a user interface element allowing a user to expedite recovery of a file according to one or more embodiments of the disclosure.

FIG. 5 is a diagram 500 illustrating an example user interface including a user interface element allowing a user to expedite recovery of a file according to one or more embodiments of the disclosure. In some embodiments, a recovery operation may include retrieving data from a corresponding backup file to recover a particular (or individual) file. For example, the particular file may be represented as a placeholder file.

As shown in this example continued from diagram 400, a user may invoke a user interface menu (e.g. via a right click, dual-finger press, etc.) in association with a placeholder file 412. In response to invoking the menu in association with the placeholder file 412, the user interface may display a menu that includes an individual file recovery user interface element (or menu option) 514 (e.g. "Recovery From Cloud" option). Accordingly, the user may initiate a recovery of the individual file represented by the placeholder file 412 by selecting the individual file recovery user interface element 514.

As further described herein, the individual file recovery operation may be available in different use cases (or circumstance, scenarios, etc.). For example, in the first use case, the individual file recovery operation may be available in response to offloading a file to the cloud-based storage system. Accordingly, the individual file recovery operation allows a user to initiate recovery of the offloaded file such that it becomes usable (e.g. restored to its original state).

In the second use case, the individual file recovery operation may be available in response to an in-progress recovery that includes creating a placeholder file 412 to indicate a file is yet to be recovered (or in the process of being recovered). Accordingly, the individual file recovery operation may include an expedite recovery operation that allows a user to prioritize recovery of a particular file such that it becomes usable sooner (e.g. recovered before other files). For example, in such a use case, the user interface element 514 may display different text such as an "Expedite Recovery" option. Accordingly, the user may also initiate an expedited recovery of the file represented by the placeholder file 412 by selecting the user interface element 514.

As described, once the recovery of the individual file is complete (e.g. in either of the example use cases), the placeholder file 412 may be replaced by the actual (or original) file (e.g. video file with the filename of "Vacation_Video.mpg").

It should be noted that the recovery operations discussed above (e.g. offloading and expedited recovery) may also be initiated using methods in addition to invoking user interface elements. For example, such operations may be initiated from an application interface provided by the backup agent (e.g. user selecting particular files in response to the backup agent providing a list of files). As another example, an offloading may be performed by a policy based on various attributes (e.g. offload all files that have a particular file extension, that are greater than a predefined file size, and have not been accessed in the last month). In addition, the backup agent may also automatically perform such operations. For example, the backup agent may automatically initiate expedited recovery of files that have been accessed within the last day.

Figure 6:
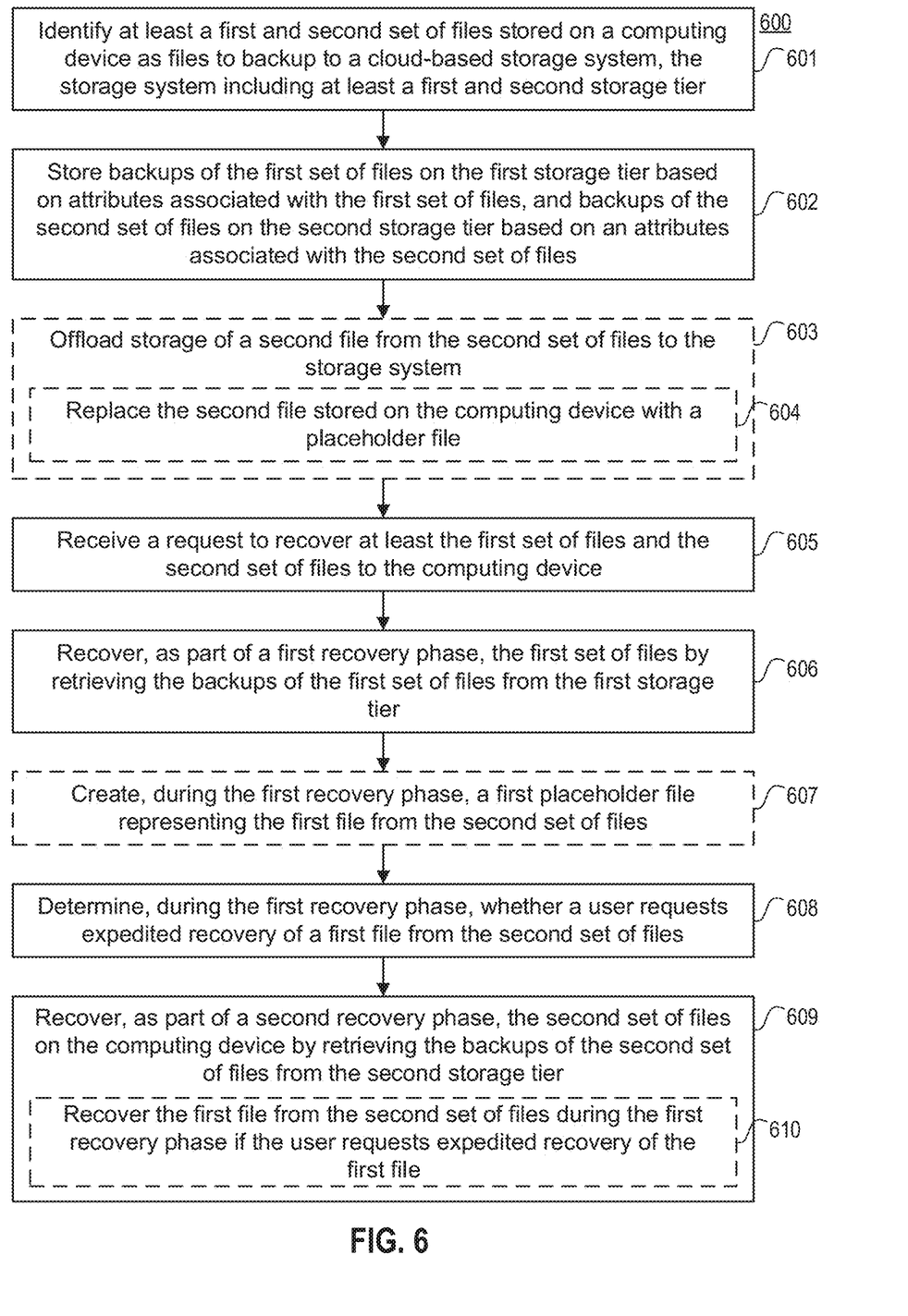
FIG. 6 is a flow diagram illustrating an example method of storing and recovering backup data using multiple storage tiers of a cloud-based storage system according to one or more embodiments of the disclosure.

FIG. 6 is a flow diagram 600 illustrating an example method of storing and recovering backup data using multiple storage tiers of a cloud-based storage system according to one or more embodiments of the disclosure. Process 600 may use processing logic, which may include software, hardware, or a combination thereof. For example, process

600 may be performed by a system including one or more components described in operating environment 100.

In 601, the system (e.g. backup agent 120) may identify at least a first set of files (e.g. Files 115A-B) and a second set of files (e.g. Files 115C-D) stored on a computing device (e.g. computing device 110) as files to backup to a cloud-based storage system (e.g. storage system 150). In some embodiments, the storage system may include at least a first storage tier (e.g. Storage Tier 1 151) and a second storage tier (e.g. Storage Tier 2 152). In some embodiments, the second storage tier may be associated with a storage cost less than a storage cost associated with first storage tier.

In 602, the system may store backups of the first set of files (e.g. Backup Files 155A-B) on the first storage tier based on an attribute (e.g. attribute 125A) associated with the first set of files, and backups of the second set of files (e.g. Backup Files 155C-D) on the second storage tier based on an attribute (e.g. attribute 125B) associated with the second set of files.

In some embodiments, the attributes (e.g. attributes 125A) associated with the first set of files may indicate the first set of files are associated with one or more file types included in a predefined list of file types, and the attributes (e.g. attributes 125B) associated with the second set of files may indicate the second set of files are associated with one or more file types not included in the predefined list of file types. For example, the predefined list of file types may include documents and certain system files that are to be stored in the first storage tier (e.g. high or standard storage tier). Accordingly, the system may determine the files of the first set of files are associated with file extensions associated with documents (e.g. doc, txt, pdf, etc.), or file extensions associated with system files (e.g. sys, dll, drv, etc.), whereas the file extensions of the second set of files are not associated with such file types.

In some embodiments, the system may transfer (or move, redistribute, etc.) backup files from the first storage tier to the second storage tier. For example, storing the backups of the second set of files on the second storage tier may include initially storing the backups of the second set of files on the first storage tier, determining a presence of a parameter associated with the second set of files, and subsequently storing the backups of the second set of files on the second storage tier, in response to determining the presence of the parameter. In some embodiments, the parameter may include an amount of time the second set of files have been stored on the first storage tier. In addition, in some embodiments, the parameter may include a file type associated with the second set of files. For example, the system may transfer all backup files corresponding to certain file types (e.g. particular file extension) stored on the computing device that have not been accessed for over a month. In addition, the system may also transfer (or move, redistribute, etc.) backup files from the second storage tier to the first storage tier. For example, the system may determine that certain files stored on the computing device have been accessed more frequently, and in response, may transfer the backups of such files from the second storage tier to the first storage tier to provide faster recovery of such files.

In some embodiments, in 603, the system may offload storage of a second file (e.g. File D 115D) from the second set of files to the storage system. For example, the system may delete the second file from the computing device (e.g. local storage), and thus, only store the second file on the storage system (e.g. remote cloud-based storage). In some embodiments, offloading storage of the second file may be in response to storing the backup of the second file on the second storage tier. In addition, or alternatively, in some embodiments, offloading storage of the second file may be initiated in response to a user selecting an offloading user interface element (e.g. user interface element 314) associated with the second file. In addition, in some embodiments, the system may automatically offload certain files based on certain attributes, or the backup policy. For example, all files that correspond to backup files stored on the second storage tier may be offloaded.

In some embodiments, in 604, the system may replace the second file stored on the computing device with a second placeholder file (e.g. placeholder file 412) as part of offloading storage of the second file to the storage system. In some embodiments, the second placeholder file may include a file extension indicating the second file is stored on the second tier storage. In some embodiments, the system may initiate individual recovery of the second file (e.g. offloaded file). For example, a user may request individual recovery of the second file on a user interface of the computing device by selecting an individual file recovery user interface element (e.g. individual file recovery user interface element 514) associated with the second placeholder file.

In 605, the system may receive a request to recover (or restore) at least the first set of files and the second set of files to the computing device. For example, the backup agent may provide an interface that allows a user to initiate the recovery of an entire computing device or particular files. In some embodiments, the system may recover files using multiple recovery phases. For example, a first phase may recover files with corresponding backup files stored on the first storage tier, and a second phase may recover files with corresponding backup files stored on the second storage tier.

More particularly, in 606, the system may recover, as part of a first recovery phase, the first set of files on the computing device by retrieving the backups of the first set of files from the first storage tier. In some embodiments, the first recovery phase may include recovering all (or most) of the files stored on the first storage tier. In some embodiments, the system may determine a recovery order amongst the first set of files based on the attributes associated with the first set of files. For example, certain file types (e.g. with certain file extensions), or files that have been most recently accessed may be prioritized (e.g. recovered first) over other files from the first set of files.

In some embodiments, the first recovery phase may include recovering (or restoring, reconstructing, etc.) all, or a portion, of a file system of the computing device. In some embodiments, the first storage tier may store a "thin" image of the file system. For example, as part of the recovery process, the file system (e.g. filenames and directory structure) may be recovered using placeholder files for files that are to yet to be recovered. For example, depending on the number and size of the files to be recovered, phases of the recovery process may take multiple hours. Accordingly, the use of placeholder files may allow the user to perform expedited recovery of individual files.

In 607, the system create a first placeholder file (e.g. placeholder file 412) on the computing device representing the first file from the second set of files (e.g. File C 115C). For example, the placeholder file may provide an indication the first file is yet to be recovered. In some embodiments, the system may create the first placeholder file during the first recovery phase. For example, the first placeholder file may be created after a file system (or portion thereof) has been recovered, but before the actual data of the first file has been recovered to the computing device. In addition, the first placeholder file may be replaced by the first file upon completion of recovery of the first file.

In 608, the system may determine whether a user requests expedited recovery of a first file from the second set of files. In some embodiments, such a determination may be made during the first recovery phase. In some embodiments, the user may request expedited recovery of the first file by selecting an individual file recovery user interface element (e.g. user interface element 514) associated with the first placeholder file (e.g. placeholder file 412). For instance, the individual file recovery user interface element may be provided on a user interface of the computing device. In some embodiments, expedited recovery of the first file may be requested from an application associated with the backup agent.

In some embodiments, the system may also determine whether a user requests expedited recovery of a third file (e.g. File B 115B) from the first set of files. For example, in response to such a request, the third file may be prioritized (e.g. moved to the top of the recovery queue) amongst files stored on the first storage tier (e.g. File B 115B recovered before File A 115A).

In 609, the system may recover, as part of a second recovery phase, the second set of files on the computing device by retrieving the backups of the second set of files from the second storage tier. In some embodiments, the second recovery phase may be initiated after completion of the first recovery phase.

In 610, the system may recover the first file from the second set of files during the first recovery phase if the user requests expedited recovery of the first file. For example, instead of recovering the first file after the first recovery phase (e.g. after retrieving all the data from the first storage tier), the system may prioritize recovery of the first file (e.g. prioritize recovery of File C 115C over File A 115A and/or File B 115B). For instance, in some embodiments, in response to receiving the expedited recovery request, the system may pause the recovery of one or more files (e.g. from the first set of files), commence the recovery of the first file, and then resume the paused recovery of the one or more files once the recovery of the first file is complete.

It should be noted that certain processes associated with the second recovery phase may occur in parallel (or concurrently) with the first recovery phase. For example, the storage system may store the backup files within data objects. Accordingly, part of the recovery process may include scanning the various objects within the first or second storage tier as part of the first or second recovery phases.

In some embodiments, the system may also determine a recovery order amongst the second set of files based on the attributes associated with the second set of files. For example, certain file types (e.g. with certain file extensions), or files that have been most recently accessed may be prioritized (e.g. recovered first) over other files from the second set of files.

Accordingly, in some embodiments, the processes (or methods) described herein may introduce intelligence into storage and recovery of backup files when using multiple storage tiers of a cloud-based storage.

Figure 7:
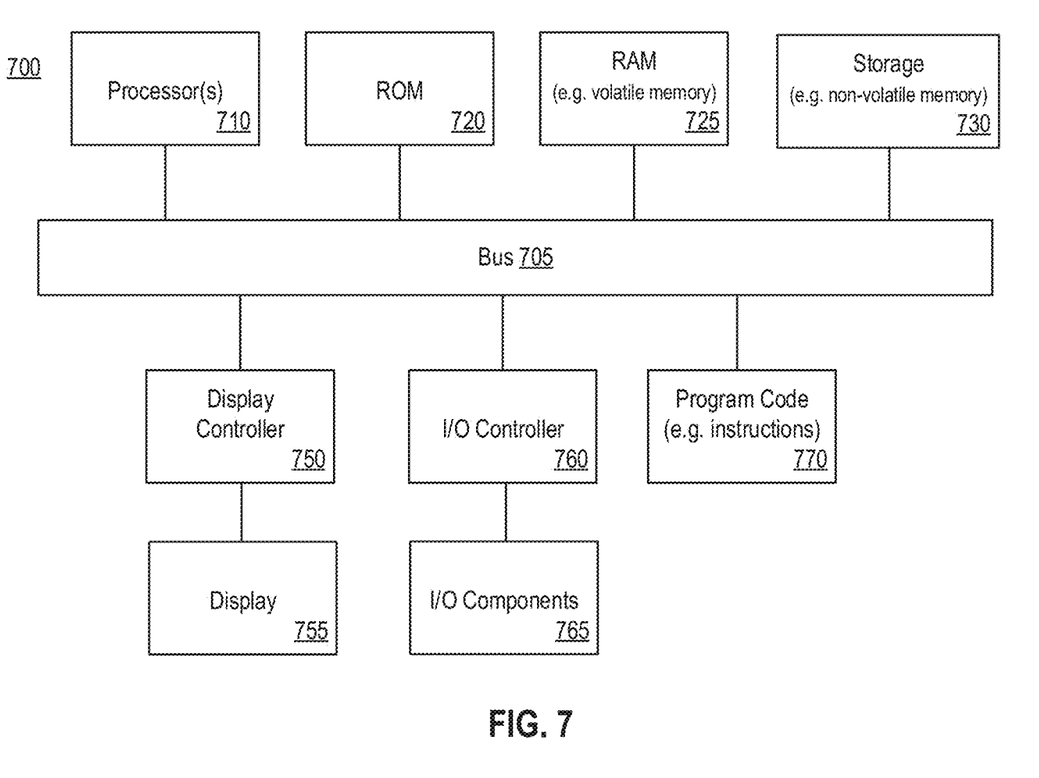
FIG. 7 is a block diagram illustrating an example computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. computing device 110, backup agent 120, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup agent 120). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   identify, by a backup agent, at least a first set of files and a second set of files stored on a computing device as files to backup to a cloud-based storage system, the storage system including at least a first storage tier and a second storage tier, the second storage tier associated with a storage cost less than a storage cost associated with first storage tier;
   store, by the backup agent, backups of the first set of files on the first storage tier based on an attribute associated with the first set of files, and backups of the second set of files on the second storage tier based on an attribute associated with the second set of files;
   receive a request to recover at least the first set of files and the second set of files to the computing device;
   recover, as part of a first recovery phase, the first set of files on the computing device by retrieving the backups of the first set of files from the first storage tier;
   determine, during the first recovery phase, whether a user requests expedited recovery of a first file from the second set of files; and
   recover, as part of a second recovery phase, the second set of files on the computing device by retrieving the backups of the second set of files from the second storage tier including recovering the first file from the second set of files during the first recovery phase if the user requests expedited recovery of the first file.

2. The system of claim 1, wherein the plurality of instructions, when executed, further cause the one or more processors to:
   create, during the first recovery phase, a first placeholder file on the computing device representing the first file from the second set of files, the first placeholder file replaced by the first file upon completion of recovery of the first file, and
   wherein the user requests expedited recovery of the first file on a user interface of the computing device by selecting an individual file recovery user interface element associated with the first placeholder file.

3. The system of claim 1, wherein the plurality of instructions, when executed, further cause the one or more processors to:
   offload storage of a second file from the second set of files to the storage system by deleting the second file from the computing device, in response to storing the backup of the second file on the second storage tier.

4. The system of claim 3, wherein the offloading storage of the second file from the second set of files to the storage system includes:
   replacing the second file stored on the computing device with a second placeholder file including a file extension indicating the second file is stored on the second tier storage.

5. The system of claim 4, wherein the offloading storage of the second file to the storage system is initiated in response to a user selecting an offloading user interface element associated with the second file.

6. The system of claim 1, wherein storing the backups of the second set of files on the second storage tier includes:
   initially storing the backups of the second set of files on the first storage tier;
   determining a presence of a parameter associated with the second set of files; and
   subsequently storing the backups of the second set of files on the second storage tier, in response to determining the presence of the parameter.

7. The system of claim 6, wherein the parameter includes at least one of an amount of time the second set of files have been stored on the first storage tier, and a file type associated with the second set of files.

8. The system of claim 1, wherein the attributes associated with the first set of files indicates the first set of files are associated with one or more file types included in a predefined list of file types, and the attributes associated with the second set of files indicates the second set of files are associated with one or more file types not included in the predefined list of file types.

9. A method comprising:
   identifying, by a backup agent, at least a first set of files and a second set of files stored on a computing device as files to backup to a cloud-based storage system, the storage system including at least a first storage tier and a second storage tier, the second storage tier associated with a storage cost less than a storage cost associated with first storage tier;

storing, by the backup agent, backups of the first set of files on the first storage tier based on an attribute associated with the first set of files, and backups of the second set of files on the second storage tier based on an attribute associated with the second set of files;

receiving a request to recover at least the first set of files and the second set of files to the computing device;

recovering, as part of a first recovery phase, the first set of files on the computing device by retrieving the backups of the first set of files from the first storage tier;

determining, during the first recovery phase, whether a user requests expedited recovery of a first file from the second set of files; and recovering, as part of a second recovery phase, the second set of files on the computing device by retrieving the backups of the second set of files from the second storage tier including recovering the first file from the second set of files during the first recovery phase if the user requests expedited recovery of the first file.

10. The method of claim 9, further comprising:

creating, during the first recovery phase, a first placeholder file on the computing device representing the first file from the second set of files, the first placeholder file replaced by the first file upon completion of recovery of the first file, and wherein the user requests expedited recovery of the first file on a user interface of the computing device by selecting an individual file recovery user interface element associated with the first placeholder file.

11. The method of claim 9, further comprising:

offloading storage of a second file from the second set of files to the storage system by deleting the second file from the computing device, in response to storing the backup of the second file on the second storage tier.

12. The method of claim 11, wherein the offloading storage of the second file from the second set of files to the storage system includes:

replacing the second file stored on the computing device with a second placeholder file including a file extension indicating the second file is stored on the second tier storage.

13. The method of claim 12, wherein the offloading storage of the second file to the storage system is initiated in response to a user selecting an offloading user interface element associated with the second file.

14. The method of claim 9, wherein storing the backups of the second set of files on the second storage tier includes:

initially storing the backups of the second set of files on the first storage tier;

determining a presence of a parameter associated with the second set of files, the parameter including at least one of an amount of time the second set of files have been stored on the first storage tier, and a file type associated with the second set of files; and subsequently storing the backups of the second set of files on the second storage tier, in response to determining the presence of the parameter.

15. A computer program product comprising a non-transitory computer-readable medium having a computer-readable program code embodied therein to be executed by one or more processors, the program code including instructions to:

identify, by a backup agent, at least a first set of files and a second set of files stored on a computing device as files to backup to a cloud-based storage system, the storage system including at least a first storage tier and a second storage tier, the second storage tier associated with a storage cost less than a storage cost associated with first storage tier;

store, by the backup agent, backups of the first set of files on the first storage tier based on an attribute associated with the first set of files, and backups of the second set of files on the second storage tier based on an attribute associated with the second set of files;

receive a request to recover at least the first set of files and the second set of files to the computing device;

recover, as part of a first recovery phase, the first set of files on the computing device by retrieving the backups of the first set of files from the first storage tier;

determine, during the first recovery phase, whether a user requests expedited recovery of a first file from the second set of files; and recover, as part of a second recovery phase, the second set of files on the computing device by retrieving the backups of the second set of files from the second storage tier including recovering the first file from the second set of files during the first recovery phase if the user requests expedited recovery of the first file.

16. The computer program product of claim 15, wherein the program code includes further instructions to:

create, during the first recovery phase, a first placeholder file on the computing device representing the first file from the second set of files, the first placeholder file replaced by the first file upon completion of recovery of the first file, and wherein the user requests expedited recovery of the first file on a user interface of the computing device by selecting an individual file recovery user interface element associated with the first placeholder file.

17. The computer program product of claim 15, wherein the program code includes further instructions to:

offload storage of a second file from the second set of files to the storage system by deleting the second file from the computing device, in response to storing the backup of the second file on the second storage tier.

18. The computer program product of claim 17, wherein the offloading storage of the second file from the second set of files to the storage system includes:

replacing the second file stored on the computing device with a second placeholder file including a file extension indicating the second file is stored on the second tier storage.

19. The computer program product of claim 18, wherein the offloading storage of the second file to the storage system is initiated in response to a user selecting an offloading user interface element associated with the second file.

20. The computer program product of claim 15, wherein storing the backups of the second set of files on the second storage tier includes:

initially storing the backups of the second set of files on the first storage tier;

determining a presence of a parameter associated with the second set of files, the parameter including at least one of an amount of time the second set of files have been stored on the first storage tier, and a file type associated with the second set of files; and subsequently storing the backups of the second set of files on the second storage tier, in response to determining the presence of the parameter.

\* \* \* \* \*